United States Patent
Hermann et al.

(10) Patent No.: US 9,695,726 B2
(45) Date of Patent: Jul. 4, 2017

(54) METERING ARRANGEMENT AND METHOD FOR OPERATING A METERING ARRANGEMENT

(75) Inventors: Thomas Hermann, Fellbach (DE); Dan Keilhoff, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/994,177

(22) PCT Filed: Dec. 1, 2011

(86) PCT No.: PCT/EP2011/006025
§ 371 (c)(1),
(2), (4) Date: Aug. 22, 2013

(87) PCT Pub. No.: WO2012/079708
PCT Pub. Date: Jun. 21, 2012

(65) Prior Publication Data
US 2013/0327407 A1    Dec. 12, 2013

(30) Foreign Application Priority Data
Dec. 17, 2010  (DE) .................. 10 2010 054 912

(51) Int. Cl.
*F01N 3/00*     (2006.01)
*F01N 3/20*     (2006.01)
*F01N 5/02*     (2006.01)

(52) U.S. Cl.
CPC ............... *F01N 3/208* (2013.01); *F01N 5/02* (2013.01); *F01N 2560/06* (2013.01);
(Continued)

(58) Field of Classification Search
CPC ... F01N 3/208; F01N 5/02; F01N 9/00; F01N 3/20; F01N 11/002; F01N 11/005;
(Continued)

(56) References Cited

U.S. PATENT DOCUMENTS 5,884,475 A * 3/1999 Hofmann et al. .............. 60/274
7,220,205 B2   5/2007 Nagai et al.
(Continued)

FOREIGN PATENT DOCUMENTS

DE  10 2005 025 678 A1   1/2006
DE  10 2004 061 259 A1   7/2006
(Continued)

OTHER PUBLICATIONS

German-language Written Opinion (PCT/ISA/237) dated Mar. 2, 2012 with English translation (Seven (7) pages.
(Continued)

*Primary Examiner* — Phutthiwat Wongwian
*Assistant Examiner* — Kelsey Stanek
(74) *Attorney, Agent, or Firm* — Crowell & Moring LLP

(57) ABSTRACT

A method and arrangement for controlling heating and thawing of a metering arrangement with a metering device for the feeding of a reducing agent solution for the exhaust gas after treatment in an exhaust system. The metering device is connected with a supply container for the reducing agent solution via at least one pipe. At least one heating device is provided for the heating of at least one component of the metering arrangement. At least one first component of the metering arrangement is assigned a first heating device, which can be operated separately from a second heating device provided for the heating of at least a second component of the metering arrangement.

13 Claims, 1 Drawing Sheet

(52) U.S. Cl.
CPC .. *F01N 2610/10* (2013.01); *F01N 2610/1486* (2013.01); *Y02T 10/16* (2013.01); *Y10T 137/0318* (2015.04)

(58) Field of Classification Search
CPC ............... F01N 3/2066; F01N 2610/10; F01N 2610/1486; F01N 2560/06
USPC ........................................ 137/1; 60/272–324
See application file for complete search history.

(56) References Cited

U.S. PATENT DOCUMENTS

| | | | |
|---|---|---|---|
| 7,930,878 | B2 | 4/2011 | Cook et al. |
| 8,522,530 | B2* | 9/2013 | Igarashi et al. ................. 60/277 |
| 2007/0035832 | A1* | 2/2007 | Hirata ................ B01D 53/9409 60/295 |
| 2007/0119153 | A1 | 5/2007 | Pierz et al. |
| 2008/0250779 | A1 | 10/2008 | Bruck et al. |
| 2009/0078692 | A1 | 3/2009 | Starck |
| 2009/0084095 | A1* | 4/2009 | Dalton ............................ 60/301 |
| 2009/0126349 | A1* | 5/2009 | Shimomura et al. ........... 60/286 |
| 2010/0064670 | A1 | 3/2010 | Starck et al. |
| 2010/0187218 | A1* | 7/2010 | Naydenov .......... B01D 53/9431 219/483 |
| 2010/0229532 | A1* | 9/2010 | Ohno ..................... F01N 3/208 60/274 |
| 2011/0030343 | A1* | 2/2011 | Kiser et al. ..................... 60/274 |
| 2011/0062357 | A1* | 3/2011 | Pohl ..................... F01N 3/2066 251/129.01 |
| 2011/0099983 | A1* | 5/2011 | Ohno ..................... F01N 3/2066 60/277 |
| 2011/0113765 | A1* | 5/2011 | Bruck et al. .................... 60/303 |

FOREIGN PATENT DOCUMENTS

| | | |
|---|---|---|
| DE | 10 2005 017 402 A1 | 10/2006 |
| DE | 10 2005 037 201 A1 | 2/2007 |
| DE | 10 2006 049 591 A1 | 5/2007 |
| DE | 10 2006 046 900 A1 | 4/2008 |
| DE | 10 2008 008 324 A1 | 8/2008 |
| DE | 10 2008 043 897 A1 | 5/2009 |
| JP | 2009-97348 A | 5/2009 |
| JP | 2010-65581 A | 3/2010 |
| WO | WO 2006/136306 A1 | 12/2006 |
| WO | WO 2009/135768 A1 | 11/2009 |

OTHER PUBLICATIONS

International Search Report dated Mar. 2, 2012 with English translation (Eight (8) pages).
English translation of Japanese Office Action dated Jul. 22, 2014 (three (3) pages).

* cited by examiner

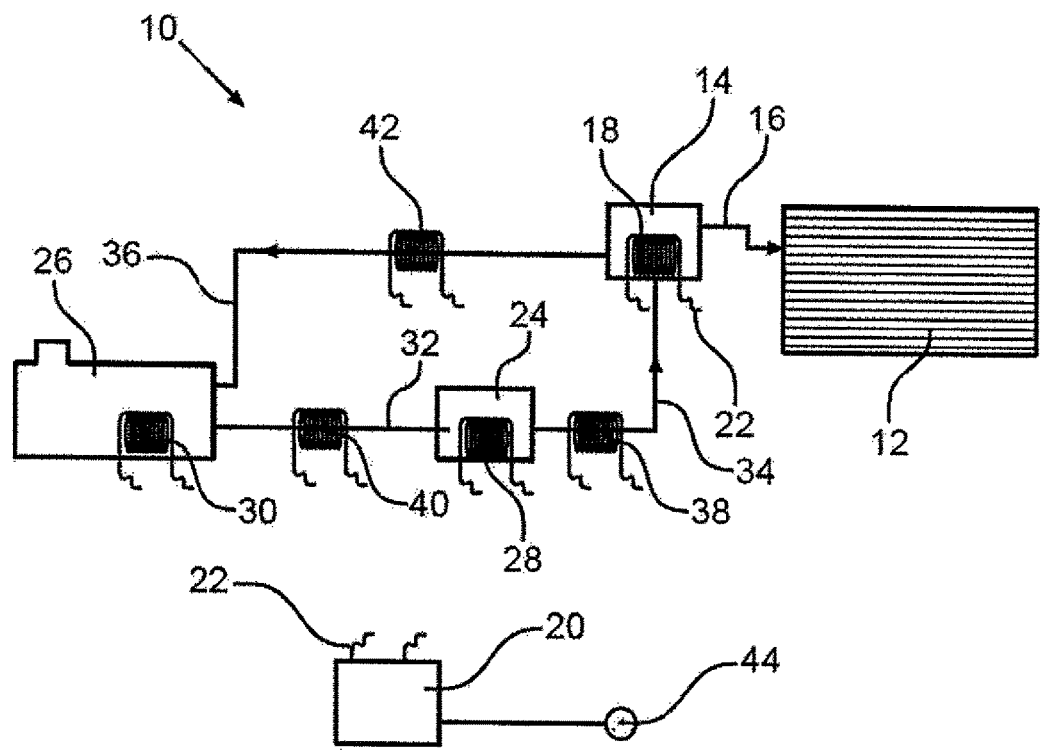

METERING ARRANGEMENT AND METHOD FOR OPERATING A METERING ARRANGEMENT

BACKGROUND AND SUMMARY OF THE INVENTION

Exemplary embodiments of the present invention relate to a metering arrangement with a metering device for the feeding of a reducing agent solution for the exhaust gas after-treatment in an exhaust gas system. The metering device is connected with a supply container for the reducing agent solution via at least one pipeline. At least one heating device is provided for the heating of at least one component of the metering arrangement. Furthermore, exemplary embodiments of the present invention involve a method for the operation of such a metering arrangement.

A known prior art metering system includes a metering device that feeds an aqueous urea solution into an exhaust system. This serves as a reducing agent solution in the exhaust system for the provision of ammonia, which then, in a selective catalytic reduction reaction with the oxides of nitrogen present in the exhaust gas forms nitrogen and water. This reduction reaction takes place in a so-called SCR-catalytic converter (SCR=selective catalytic reduction). The freezing point of a commercial aqueous urea solution lies below that of water, and it can freeze at very low outside temperatures of less than −11° C. From the prior art it is known, that a pump in which there is a frozen urea solution can be thawed out by means of a heating device and the thawed out aqueous solution then delivered by the pump from a supply container to a metering device.

Previously, damage to the components of such a generic type of metering arrangement has been observed as a consequence of the freezing up of the reducing agent solution.

Exemplary embodiments of the present invention are directed to a metering arrangement and a method for the operation of such a metering arrangement, which offer particularly good protection from damage caused by the frozen reducing agent solution.

The metering arrangement according to the invention, which is particularly intended for a vehicle, comprises a metering device, by means of which a reducing agent solution for the exhaust gas after treatment can be fed into an exhaust system. The metering device is connected via at least one pipeline with a supply container for the reducing agent solution. At least one heating device heats at least one component of the metering arrangement. Here at least a first component of the metering arrangement is assigned a first heating device, which is arranged operable separately from a second heating device for the heating of at least a second component of the metering arrangement in such a way, that a point in time of the freezing and/or a point in time of the thawing of the first component or of a section of the first component can be established in relation to a point in time of the freezing and/or a point in time of the thawing of the second component and/or of a section of the second component. In this way, through targeted operation of the respective heating device it can be ensured that first the at least first component and then the least second component of the metering arrangement are heated and thus the frozen reducing agent solution present in the respective components is thawed out. Furthermore the sequence and the point in time of the freezing of the components or of a section of a respective component of the metering arrangement on a freezing of the reducing agent solution in the metering arrangement can be fixed and thereby damage due to freezing avoided.

This is based on the knowledge that a customary aqueous reducing agent is at its largest specific volume when the solution is frozen and the temperature of the frozen solution corresponds to that of the freezing point of the solution. However, a further cooling of the reducing agent solution is accompanied by a reduction in volume. Correspondingly, the volume of the frozen solution increases when is heated from a temperature below the freezing point up to the freezing point. Therefore, if the frozen reducing agent solution in a first component is present and this is then thawed out, whilst neighboring components still contain the frozen solution, then the increase in volume of the reducing agent solution within the first component leads to a strong force, which can lead to damage to this component.

In accordance with exemplary embodiments of the present invention, an offset in time of the operation of the heating devices is provided, in which a sequence of the thawing of the reducing agent solution exists in the components of the metering arrangement, which takes into account the sensitivity of the individual components with respect to the force exerted on the individual components due to the increase in volume of the reducing agent solution. Thus, the most sensitive component can be thawed last, so that space is created to be taken up by this component of the reducing agent solution in the increase in volume of the reducing agent solution accompanying the approach to the freezing point from a temperature below the freezing point. This can prevent damage due to the frozen reducing agent solution.

If a control device for the operation of at least one of the heating devices is formed as an electronic control unit, this can be used very simply for the activation or deactivation of electrical heating devices. If at least one of the heating devices is formed as a heat exchanger, then by means of the control of valves and similar shut off devices it can be ensured that certain heating devices give out heat and others do not. Also, an electronic control unit of and in conjunction with the metering arrangement can control at least one heating device in determining whether at least one heat exchanger is to used for the heating of the assigned component of the metering arrangement. Also the triggering of an electrical heating device can take place at the same time or with a time delay for the heating by means of a heat exchanger.

Analogously to thawing, the heating devices can be operated with a time offset, in order to achieve a sequence of the freezing of the components of the metering arrangement. The basis for this is the knowledge that the freezing of the reducing agent solution, commencing from the liquid condition of the solution, is likewise accompanied by an increase in volume. If at a position of the metering device additional volume generated through freezing cannot be displaced, for example because the surrounding areas are already frozen, then likewise damage to the metering arrangement can occur. It is therefore preferably provided that through a time control of heatings a freezing, especially of a mechanically sensitive area of the metering arrangement, or of a component of the metering arrangement, is facilitated before a freezing of neighboring areas is enabled. Those existing heating devices, which are assigned to pre-determined, in particular to mechanically sensitive components of the metering arrangement, can be deactivated in a targeted fashion, or simply not operated.

It can be provided, that a component, whose parts would be particularly heavily loaded through the freezing of the reducing agent solution if it would freeze last, is simply not heated. If a first heating device is not operated, then a cooling down of at least one of the components of the metering arrangement assigned to the first heating device to below the freezing point of the reducing agent solution is permitted. Consequently the reducing agent solution in this first, sensitive component, freezes first and before other, heated components.

Furthermore a second heating device can be operated in such a way, that a second components of the metering arrangement assigned to the second heating device is held at a temperature above the freezing point. While the second heating device prevents a freezing of the reducing agent solution in the at least one second component, the freezing of the at least one first, sensitive component or of an area of the component is permitted. The freezing of the reducing agent solution in at least a second component is hereby uncritical in respect of the accompanying increase in volume associated with the freezing. Thus, the reducing agent solution freezes last in the second, insensitive component or after the first component respectively.

Since the heating devices assigned to the respective components can be operated separately from each other, a time-based sequence of the freezing of the components of the metering arrangement can thus be provided, when the heating device assigned to the respective component is correspondingly operated with an offset in time to another heating device of the metering arrangement. Thus, sensitive components can be protected by defining the sequence of the initiation of the heating devices.

Thus, the sensitive components of the metering arrangement can be devised comparatively cost-effectively, since expensive precautions can be avoided, which facilitate the compensation of an increase in volume of the reducing agent solution found in the components. Also, individual parts of a sensitive component can be designed such that they merely cope with the rise in pressure accompanying a minimal increase in volume of the reducing agent solution, which is brought about when the components last or freeze first. Thus, by this means a particularly good protection can be achieved against damage due to the frozen reducing agent solution, and at the same time a metering arrangement can be created with favorably-priced components.

In an advantageous embodiment of the invention in a thawing operation, at least a section of the at least one second component of the metering arrangement is brought from a temperature below the freezing point to the temperature of the freezing point of the reducing agent solution at a point in time before this is achieved by the at least one first component. If, for example, the second component is the supply container and the first component is the metering device, then in the thawing mode by appropriate time-wise offset operation of the heating devices it can be arranged that first the frozen reducing agent solution in the supply container is thawed out and then the frozen reducing agent solution in the metering device is thawed out.

Furthermore, the sensitive components of the metering arrangement can be thawed out last and the less sensitive components of the metering arrangement can be thawed first. Thus, the less sensitive components already containing the thawed out reducing agent solution provide a reception volume, in which liquid reducing agent solution formed on the thawing of the later heated components can be absorbed. In addition, the increased volume of the frozen reducing agent solution that forms on the heating up of the frozen reducing agent solution from the temperature below the freezing point to the temperature of the freezing point, can ingress into the reception volume.

In a further advantageous embodiment of the invention the at least one first component comprises the metering device of the metering arrangement. This component is thus relatively complex and sensitive. A thawing of the metering device or certain volume areas of the metering device before a thawing of neighboring areas of the metering device or of neighboring components of the metering arrangement or of components of the metering arrangement that are connected together can therefore cause particularly undesirable damage. The same applies for a freezing of the metering device or certain volume areas of the metering device after a freezing of neighboring areas of the metering device or of neighboring components of the metering arrangement or of components of the metering arrangement that are connected together. If, however, in the area of the metering device or in certain volume areas of the metering device a freezing of the reducing agent solution is allowed to occur before a freezing of neighboring volume areas of the metering device or before a freezing of components connected to the metering device, possibly in that an assigned first heating device is operated independently or with a time offset with respect to a second heating device, then the frozen reducing agent solution can find its way into surrounding, as yet unfrozen areas, of the metering arrangement, and damage to the sensitive metering device is avoidable. Also the volume increase of the reducing agent solution approaching the freezing point from a lower temperature can thus be compensated.

Alternatively or additionally, the at least one first component of the metering arrangement comprises a pump device for the pressurization of the metering device with the reducing agent solution. With such a pump device a particularly marked increase in the internal pressure can occur due to an early approach to the freezing point, due to a thawing before that of other components, leading to damage, which should be avoided. The same applies to a late freezing of the pump device. In other words the pump device is also a comparatively sensitive component and thus requires protection in special measure, preferably taking account of the sequence of the components freezing one after the other, and preferably likewise being given attention with a priority similar to that of the metering device.

On thawing it is, on the other hand, favorable if the pump device is only warmed up from a temperature below that of the freezing point of the reducing agent solution to the freezing point, when components of the metering arrangement bounding the pump device have already created space for the extra volume itself, due to thawing of the solution.

It has further been shown to be advantageous if the at least one second component of the metering arrangement comprises an entry pipe leading to the metering device and/or a return pipe leading from the metering device to the supply container. If these pipes contain liquid reducing agent solution due to heating of the latter, then the increase in volume of the reducing agent solution in the area of the metering device and/or in the area of the pump device, heated or cooled to the freezing point is not hindered by frozen connecting pipes.

In a further advantageous embodiment of the invention, the at least one second component of the metering arrangement comprises the supply container. If this supply container on freezing is held until last at a temperature, which is above the freezing point of the reducing agent solution, the increasing additional volume to be received due to the freezing of the remaining components of the metering arrangement can particularly simply arrive in the supply container. On the other hand, when thawing the metering arrangement the supply container can be heated up particularly favorably before the remaining components of the metering arrangement. Then the supply container can simply absorb the additional volume of the reducing agent solution, which then on subsequent heating up the remaining components of the metering arrangement builds from a temperature below the freezing point up to the freezing point.

Preferably the heating devices can also be operated in such a way, that a cooling off of the inlet pipe and/or of the return pipe to a temperature below the freezing point of the reducing agent solution is permissible before the cooling of the supply container to this temperature. This takes account of the fact that a freezing of the reducing agent solution in the inlet pipe or in the return pipe is uncritical if the pipe is blocked on one side by frozen reducing agent solution. These pipes of the metering arrangement can be simply and economically constructed from a material, which is adequately elastic to cope with the increase in volume of the reducing agent solution.

This also applies when, additionally or alternatively, the heating devices can be operated in such a way that a heating up of the inlet pipe and/or the return pipe to the freezing point takes place after the heating up of the supply container to this temperature. If frozen reducing agent solution expanding when warmed up to the freezing point presses from the supply container into the pipes, these pipes may yield if they are formed from an elastic material. For example, synthetic elastomer material can be used as a material for the pipes, in particular such as Ethylene-Propylene-Diene rubber or Ethylene-Propylene-DieneMonomer (EPDM).

A further advantage can be achieved if the metering arrangement incorporates a heating device for the heating of a section of pipe leading from the supply container to a pump device and a further heating device for the heating of another section of pipe leading from the pump device to the metering device. Thus, a detailed sequence of the freezing or the thawing of the sections of pipe can be provided, in that the timing of the operation of the heating devices is appropriately sequenced.

Finally, it has also been shown to be advantageous if a control device designed for controlling at least one of the heating devices is coupled with a temperature sensor for the acquisition of an outside temperature. In this way, the necessary heating power can be particularly well adjusted to the thawing process. Also, during the initiation of the freezing of the components in a desired sequence, the heating power and/or the sequence or the duration of operation of a heating operation can be appropriately effectively and efficiently adjusted when the outside temperature is taken into account in the control device. In particular, subsequent to a switching off of an internal combustion engine of the vehicle, a first heating device of a component of the metering arrangement can be operated in a post-heating operation. Particularly preferred is the provision of a post heating operation, when it is established that the outside temperature lies below an adjustable prescribed threshold temperature of, for example, minus 11° C.

Such a post heating operation of an individual heating device or of a part of available heating devices of the metering arrangement can comprise an arrangement in which the corresponding heating device(s) active after shut-down of the internal combustion engine for a prescribed period of time or is/are activated for a prescribed period of time, while other heating devices of the metering arrangement remain deactivated or are deactivated. In the post heating operation it can also be provided that one or more selected heating devices of the metering arrangement can be switched on after a first prescribed period of time directly after the shut-down of the internal combustion engine for an inactive period of time, for a prescribed second period of time. By this means a freezing of an assigned area or of assigned areas of the metering arrangement can be effectively delayed or prevented.

In the post heating operation a continual, unbroken heating or a timed period of heating can be provided with a predetermined timing ratio, preferably dependent on the outside temperature and with alternating on and off phases. In this case the time span of the active switching can relate to the duration of the timed operation. By means of a timed operation, with On phases, for example in the minutes range, and Off phases, likewise in the minutes range, a freezing of such a type of heated area is prevented with a reduced heating capacity. The first and the second time periods are thereby preferably established as a function of the outside temperature as determined by the temperature sensor. Also, the timing ratio with a time-based cycled heating operation can be established as a function of the outside temperature. This can take place, for example, through appropriate preliminary investigation. The post heating operation is preferably terminated when areas neighboring the heated area are frozen and a volume expansion is no longer expected from these areas.

In the method for the operation of a metering arrangement according to the invention, which comprises a metering device for the introduction of a reducing agent solution for the exhaust gas after treatment in an exhaust system, whereby the metering device is connected with a supply container for the reducing agent solution via at least one pipe, at least one component of the metering arrangement is heated by means of at least one heating device. At least one first component of the metering arrangement is heated by means of an assigned first heating device, which is operated separately from at least one second heating device assigned to a second component of the metering arrangement.

The method, by which through the separate heating of different components of the metering arrangement and/or different areas of a component of the metering arrangement a freezing or thawing sequence of components or a freezing or thawing point in time of a component or of an area of a component of the metering arrangement is determined, enables a particularly good protection to be provided for sensitive components of the metering arrangement from damage caused by the frozen reducing agent solution.

The advantages and preferred embodiments described for the metering arrangement according to the invention are also applicable to the method according to the invention and vice-versa.

The features and combinations of features named in the description above, as well as those named in the following description of the figures and/or shown only on the figures are not solely applicable to the respective given combinations, but also in other combinations or on their own, without relinquishing the framework of the invention.

Further advantages, features and details of the invention result from the claims, the following description of preferred embodiments and also on the basis of the drawing.

BRIEF DESCRIPTION OF THE DRAWING FIGURES

The sole FIGURE schematically illustrates a metering arrangement for the feeding of an aqueous urea solution into an exhaust gas system of a vehicle.

DETAILED DESCRIPTION

The sole FIGURE illustrates, in a highly schematic form, an example embodiment of a metering arrangement 10 for the feeding of an aqueous urea solution into an exhaust gas system 12 of a vehicle. The exhaust gas system 12 has at least one exhaust gas after treatment device, not shown in greater detail in the present description, in which ammonia with oxides of nitrogen from the exhaust gas are converted to nitrogen and water. One such exhaust gas after treatment device can take the form of a so-called SCR-Catalytic Converter (SCR=selective catalytic reduction), in which in a selective catalytic reduction reaction the named conversion of ammonia and oxides of nitrogen takes place.

The aqueous urea solution is fed by means of a metering device 14 into the exhaust system 12. The metering device 14 comprises a metering valve, preferably in the form of a needle valve, whose opening has the effect that the aqueous urea solution is sprayed into the exhaust system 12. The corresponding path from the metering device 14 into the exhaust system 12 is schematically shown in the FIGURE by an arrow 16. The metering device 14 and the metering valve can thereby be mounted directly on the exhaust gas system or on a combined silencer-exhaust gas after treatment housing. The metering device 14 can also have a sensor, in order to be able to determine the quantity of aqueous urea solution to be fed into the exhaust system 12.

The aqueous urea solution can freeze at low outside temperatures. In order to be able to establish a point in time of the freezing or of the thawing of the aqueous urea solution, in particular in the metering device 14 or in a prescribed partial volume area of the metering device 14, a heating device 18 is provided in the metering device 14, which can be controlled by a control device 20 of the metering arrangement 10. The control device 20 also serves to stipulate the quantity of aqueous urea solution to be fed into the exhaust system 12 by means of the metering device 14. The heating device 18 preferably takes the form of an electrical heater, in particular a self-regulating PTC element.

In the following the control device 20 is not described in greater detail regarding the manner and means of its connection with the heating 18, via the respective connections 22. By controlling the heating device 18 by means of the control device 20 the frozen aqueous urea solution in the metering device 14 thaws or its freezing is delayed or prevented at least in the heated areas of the metering device 14. Conversely, by switching off the heating device 18 by the control device 20 the aqueous urea solution in the metering device 14 freezes, insofar that the ambient temperatures are correspondingly low.

A pump 24 delivers the aqueous urea solution from a tank 26 to the metering device 14. A heating device 28 is also provided for the pump 24, which can be operated separately from the heating 18 for the metering device 14. Also, the freezing of the aqueous urea solution in the pump 24 can be permitted by switching off the heating device 28. Likewise, by means of the heating device 28, aqueous urea solution found in the pump 24 can be thawed out or its freezing prevented.

A further heating device 30 is assigned to the tank 26, which likewise can ensure that aqueous urea solution found in tank 26 can be thawed out or that its freezing is prevented or that a freezing is permitted by switching off the heating device 30, provided that correspondingly low outside temperatures prevail.

By varying the time spans of the various heating operations or by devising different points in time for the activation and deactivation of the heating devices 18, 28, and 30 a sequence can be prescribed, in which the components of the metering arrangement 10 assigned to the respective heating devices 18, 28, and 30 become frozen, in the example of the FIGURE the metering device 14, the pump 24 and the tank 26, or specified areas of these components.

Likewise, the sequence in which the frozen aqueous urea solution is thawed out in the respective components can be controlled. The frozen aqueous urea solution is subject to an increase in volume when heated from a temperature below the freezing point to the temperature of the freezing point. The volume of the aqueous urea solution also increases as it transforms from the liquid to the solid phase.

The metering device 14 and, in particular its metering valve, are relatively sensitive. Thus, if aqueous urea solution in the metering device 14 freezes due to a low outside temperature, such that as a consequence of the increase in volume caused by the frozen condition a pressure increase that occurs cannot be reduced, then this can lead to irreversible damage to the metering device 14 and to parts of the metering device 14, in particular of the metering valve. In order to prevent this, it can be provided that the heating devices 18, 28, 30, 38, 40 and 42 are controlled in such a way, that aqueous urea solution found in the metering device 14 becomes frozen before the aqueous urea solution present in the connected sections of pipe 34 and 36 freezes and therefore the corresponding volume expansion can take place by means of a discharge of aqueous urea solution via at least one section of pipe 34, 36, connected to the metering device 14. It can therefore be provided that the heating device 18 for the metering device 14 is not activated, whilst the heating device 30 of the tank 26 and heating devices 38, 40, 42 heat the pipes. It can, however, also be provided that the heating device 18 for the metering device remains active longer or is active at a later point in time after switching off the internal combustion engine, as one or more of the heating devices of the other components of the metering arrangement 10. It can thereby be achieved, for example in advantageous fashion, that in the region of the outlet of the metering valve, in particular in the region of a valve needle seat of the metering valve aqueous urea solution present there freezes before a volume expansion region inside the metering device, which remains in fluidic connection with the outlet, freezes. In this case the heating device 18 of the metering device 14 can preferably heat the volume expansion region.

In case the metering device 14 is mounted on the outlet side on a heat-storing component such as, for example, an SCR-exhaust gas after treatment device, then it can be provided that a heating device 18 of the metering device 14 is operated as a function of the temperature of the SCR-exhaust gas after treatment device in such a way, that at low outside temperatures in the metering device 14 aqueous urea solution present in the outlet of the metering valve freezes before areas of the metering device 14 with a fluidic connection with the outlet area of the metering device 14 freeze, in particular before a expansion volume area of the metering device 14 freezes. The point in time and duration of the operation of the heating device 18 of the metering device 14, preferably provided in the region of the expansion volume area, after switching off the internal combustion engine are preferably matched to the thermal capacity of the SCR-exhaust gas after treatment device and as a function of the outside temperature or the temperature of the SCR-exhaust gas after treatment device.

By analogy, through a control of the heating devices, it can be ensured that the aqueous urea solution located in the pump 24 freezes before the aqueous urea solution in the pipe sections 32, 34 freezes. Also the pump 24 is comparatively sensitive, so that on the occurrence of a high internal pressure due to aqueous urea solution freezing in the pump 24, which can no longer escape from the pump 24, damage can be expected. On the other hand, it is less critical if the area of the metering arrangement including the tank 26 of the metering arrangement 10 freezes last, so that the metering device 14, the pump 24, the pipe sections 32, 34 of the inlet pipe and the return pipe 36 already contain frozen aqueous urea solution.

In order to further protect sensitive components of the metering arrangement 10 from damage due to freezing aqueous urea solution these components, in a particularly preferred variant the metering device 14 and/or the pump 24 have a filled, pressure-dependent volume expansion area during operation, somewhat in the style of an extendable bubble or a bellows area. Increases in volume can absorbed by expansion of such a volume expansion area. It is therefore particularly preferred that the respective volume expansion area be heated by means of the heating device 28 of the pump 24 and/or by the heating device 18 of the metering device 14. In particular, it is advantageous in this case if the heating device 28 of the pump 24 and/or the heating device 18 of the metering device 14 is/are active longer, or at a later point in time after shut-down of the internal combustion engine, as one or more of the heating devices of the other components of the metering arrangement 10.

Here the heating device 38 is available for the heating of the pipe section 34, which connects the pump 24 and the metering device 14, which likewise can be operated separately and apart from the remaining heating devices 18, 28, 30. The pipe section 32 of the inlet pipe, which connects the pump 24 with the tank 26, has a separate heating device 40.

If the aqueous urea solution in the metering device 14 is already frozen, because the heating device 18 assigned to the metering device 14 is switched off, then the heating device 38 can ensure that the section of pipe 34 remains free from ice. By this means the increase in volume of the frozen aqueous urea solution inside the metering device 14 does not lead to an undesirably high increase of the internal pressure in the metering device 14.

The metering device 14 can be correspondingly favorably priced and designed for use to withstand a comparatively low pressure.

This applies by analogy to the pump 24. Here it can also be provided that the heating device 28 assigned to pump 24 can be switched off before the heating devices 38 and 40, so that the aqueous urea solution in the pump 24 can freeze and the volume increase obtained in this way merely leads to a displacement of the still liquid aqueous urea solution in the inlet pipe.

If the pipe section 34 is made from a special elastic material, for example EPDM, then a simultaneous freezing of the metering device 14 and the pump 24 can be permitted, since then the volume of liquid aqueous urea solution can find space in the widening pipe section 34, heated by the heating device 38.

So long as the pipe section 32 is heated by means of the heating device 40, the volume of liquid aqueous urea solution displaced in the pump 24 due to the increase in volume of the freezing aqueous urea solution can be accommodated in tank 26. In the area of tank 26 the heating device 30 can ensure that the aqueous urea solution in tank 26 freezes last. In the area of the return pipe 36 the additional, separately controllable heating device 42 is provided in order also to keep the return pipe 36 free from ice, even when the metering device 14 already contains frozen aqueous urea solution. Thereby, so that the pipes, the metering device 14, the pump 24 and the tank 26 can be heated separately by means of the respective heating devices 18, 28, 30, 38, 40, 42, a sequence of freezing can be prescribed by employing a time-offset control of the respective heating devices 18, 28, 30, 38, 40 and 42.

The control device 20 can hereby activate the heating device 18 for the metering device 14 as a function of the outside temperature. Additionally, or alternatively, the control device 20 can control the heating device 18 depending on whether the heating devices 28, 30 for the pump 24 and the tank 26 are already outputting heat to the components that are assigned to them. The activation of the heating device 18, which in particular can take the form of a PTC heating, can also take place with a time delay with respect to the operation of the heating devices 28 and 30. The control device 20 is also able to not control the heating device 18 if the heating devices 28, 30 already deliver thermal heat to the components to which they are assigned.

Likewise, a thawing sequence can be prescribed, when the heating devices 18, 28, 30, 38, 40, 42 are operated in a thawing mode. In the thawing mode the heating device 30 is operated first, in order to thaw out frozen aqueous urea solution located in tank 26. To this end, first the frozen aqueous urea solution is heated from a temperature below the freezing point up to the freezing point, at which the phase transition from solid to liquid takes place. The increase in volume, which occurs on the approach to the freezing point of the aqueous urea solution, is not problematic in the area of the tank 26, which is comparatively insensitive to this. In addition, if the tank 26 is not completely full a volume of gas is available, which can be compressed.

Then, in the thawing operation the heating devices 38, 40 and 42 for heating the pipe sections 32 and 34 of the inlet pipe and the return pipe 36 to the freezing point and then for the thawing of the aqueous urea solution in these pipes are operated. If, when approaching the freezing point of the aqueous urea solution, an increase in volume occurs in the pipes, this is likewise not problematic since there is space available in tank 26 for the additional volume. In addition, the pipes can formed from an elastic material and the increase in volume compensated in this way.

Not prior to a thawing of these components of the metering arrangement 10, a thawing of the pump 24 and the metering device 14 is effected by means of the heating devices 28 and 18. If in the thawing operation during warm-up of the aqueous urea solution in the area of the metering device 14 and the pump 24 an increase in volume occurs, then space is available in the pipes and in the tank 26 for this additional volume. The aqueous urea solution thawed out in the area of the pump 24 and the metering device 14 can pass unhindered into the tank 26 via the free pipes.

The control device 20 is coupled with a temperature sensor 44, which measures the outside temperature of the vehicle. Accordingly, the heating power of the heating devices 18, 28, 30, 38, 40 and 42 can be particularly simply adjusted to that required for the maintenance of a temperature above the freezing point of the aqueous urea solution or the attainment of the temperature of the freezing point during the thawing process. It is also possible to establish, as a function of the acquired outside temperature, whether, and in which sequence and with which heating devices of the metering arrangement 10, should be active or deactivated within which time span after switching off the internal combustion engine.

The heating devices 18, 28, 30, 38, 40, 42 can be formed as heating elements powered with electrical current and/or as heat exchangers, to output heat from a through-flowing heated medium, in particular a heated liquid, such as the heated coolant of an engine of the vehicle.

In particular, the heating devices 28, 30 for the pump 24 and the tank 26 and also the heating devices 38, 40, 42 for the pipes can be formed as heat exchangers. In this way it is possible to control the operation of the heating devices 28, 30 via an engine control device, which provides for the adjustment of the engine temperature. The heating devices 38, 40, 42 for the heating of the pipe sections 32, 34 and the return pipe 36 can, in particular, be controlled by a control device for the exhaust gas after treatment, whereby the control device 20, the engine control device and the control device for the exhaust gas after treatment system communicates with each other, in order to ensure the correct sequence of the operation of the heating devices 18, 28, 30, 38, 40 and 42 in the thawing operation and when freezing is required.

In a further advantageous embodiment, at least one of the pipes provided for the transport of the aqueous urea solution of the metering arrangement 10, preferably the return pipe 36, has two separate heatable sections running through an appropriate heating device. Thereby it is generally preferred that the return pipe 26, and also the other pipes, can be heated, at least over almost their overall length. It is particularly preferred that the heating 42 of the return pipe 36 is of such a type, that it can heat a first length of pipe arranged close to the tank 26 and a connected second section of pipe, separately from each other. Preferably, in this arrangement the first section is made shorter than the second section. If a danger of freezing is established due to the undershoot of a minimum ambient temperature, then the heating devices 18, 28, 30, 38, 40 and 42 of the metering arrangement 10 are operated and controlled in such a way, that the first section of the return pipe 36 is frozen as a first component, i.e. before the other components and pipes or pipe sections of the metering arrangement 10. This can be achieved, for example, if the heating of the first pipe section is switched off before the other. An early freezing of aqueous urea solution found in the first pipe section results in a blocking effect. This prevents loading of other components of the metering arrangement 10 in fluid connection with the return pipe 36 due to a volume expansion via the return pipe 36 caused by a subsequent freezing of aqueous urea solution found in tank 26.

By analogy it can additionally or alternatively be provided, that the heating device 40 of the pipe section 32 is formed in such a way, that a first pipe section, preferably arranged close to the tank 26, and a second pipe section connected to it can be heated separately from each other. In the freezing case the heating devices 18, 28, 30, 38, 40 and 42 of the metering arrangement 10 are operated and initiated in such a way, that the first section of the pipe section 32 is the first to become frozen. For the case, that both the return pipe 36 and also the pipe section 32 have, as described, separately heatable first and second sections, in the event of freezing it is preferably provided that a freezing of this first pipe section is permitted before the freezing of other components and/or pipes or pipe sections of the metering arrangement. Accordingly, both a blocking of the tank 26 on the inlet side and on the return side is facilitated. So that on the freezing of aqueous urea solution located in tank 26, a loading caused in relation to pressure loading due to volume expansion of other components of the metering arrangement 10 in fluid connection with tank 26 is preventable. On reaching or overshooting the freezing point it is therefore preferably provided, that the heating devices 40 and/or 42 are activated after the other heating devices 28, 28 and 38. Therefore, a thawing of the first pipe section or of the first pipe section after a thawing of aqueous urea solution takes place after a thawing of aqueous urea solution in the other areas of the metering arrangement 10.

Finally, for a particularly effective protection of the metering device 14 and/or the pump 24 it is preferred that the heating devices 18, 28 are arranged near to a pressure-dependent expansion volume area. In the event of the danger of freezing, the heating devices 18 and 28 assigned to the metering device 14 and/or the pump 24 are actuated in such a way, that the corresponding expansion volume area remains free of ice for longer than a neighboring area of the metering arrangement 14 and of the pump 24 in fluid contact with the expansion area. In particular, the corresponding expansion volume area is activated, or becomes activated on the overshooting of a threshold value of the outside temperature in a reheating mode after switching off the internal combustion engine, in order to keep the expansion area free of ice longer than the surrounding areas. On the other hand, the other heating devices 30, 38, 40 and 42 can already be deactivated at an earlier point in time, in particular at approximately the same time as the switching off of the internal combustion engine. This ensures that the respective pressure-dependent expansion volume area remains available for an adequate period for the acceptance of aqueous urea solution displaced due to volume expansion.

The reheating mode can take place directly at the point in time of the switch-off of the internal combustion engine or after a prescribed waiting period, in particular after a waiting period dependent on the outside temperature after switching off the internal combustion engine. The reheating operation can thereby include a clocked heating of a predetermined component of the metering arrangement 10 or of an area of a component of the metering device 10. The switching delays and/or the heating phases of the clocked heating operation are thereby preferably adjustable as a function of the outside temperature.

For a thawing out operation it is further advantageous to activate the heating devices 18, 28, 30, 38, 40 and 42 in such a way, that pressure-dependent expansion volume areas are thawed out at an early point in time, in particular before the other areas of the metering arrangement 10.

Overall it is characteristic of the metering arrangement 10 according to the invention that, for the case of an established danger of freezing for various components and areas of the metering arrangement 10, the provided heating devices can be and are operated separately from each other, so that the point in time of the freezing of the respective components or of the respective areas or the sequence of the freezing of the components and areas can be predetermined or is predetermined. This similarly applies by analogy for the thawing of areas or components of the metering arrangement 10. Thereby, damage in the context of a freezing or thawing of aqueous urea solution within the metering device 10 can be particularly reliably and effectively avoided. In particular, the named separate actuation of the heating devices is provided during shut down periods or when the vehicle is taken out of operation and the internal combustion engine and metering is out of use. The separate actuation of the heating devices takes place on the undershooting of a threshold value of the outside temperature in order to avoid damage due to freezing. In order to avoid damage due to thawing, the separate actuation of the heating devices preferably takes place in direct connection with a start-up sequence of the internal combustion engine. In the case of normal vehicle and metering operation the prescribed heating devices 18, 30, 28, 38, 40 and 42 can be supplied with energy without problem and therefore there is in general no risk of the freezing of the metering arrangement 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the operation of a metering arrangement, which comprises a meter for feeding a reducing agent solution for exhaust gas after treatment in an exhaust system of a vehicle, wherein the meter is connected by at least one pipe with a supply container containing the reducing agent solution, the method comprising:
   separately controlling a first heater and a second heater, wherein the first heater heats the meter and the second heater heats pipe sections directly connected to the meter, and
   freezing the reducing agent solution in the meter at a point in time before freezing of the reducing agent solution in the pipe sections directly connected to the meter by operating the first and second heaters in sequence with respect to each other.

2. The method according to claim 1, wherein the first and second heaters are arranged and operated such that a point in time of thawing of the reducing agent solution in the meter is established in relation to a point in time of thawing of the reducing agent solution in the pipe sections.

3. The method according to claim 2, wherein the heaters are operated such that
   an intake pipe leading to the meter or of a return pipe leading from the meter to the supply container is cooled to a temperature below the freezing point before the cooling of the supply container to the temperature below the freezing point, or
   the intake pipe or the return pipe is heated to the freezing point after the heating of the supply container to the freezing point.

4. The method according to claim 1, wherein the heaters are operated such that
   an inlet pipe leading to the meter or a return pipe leading from the meter to the supply container is cooled to a temperature below the freezing point before cooling of the supply container to the temperature below the freezing point, or
   the inlet pipe or the return pipe is heated to the freezing point after the heating of the supply container to the freezing point.

5. The method according to claim 1, wherein the first heater or the second heater is operated in a reheating operation subsequent to a switch-off of an internal combustion engine of the vehicle if an outside temperature is below a predetermined threshold temperature.

6. The method according to claim 5, wherein the first heater is operated in such a way in a reheating operation that the first heater is active for a settable time span directly following the switch-off of the internal combustion engine.

7. The method according to claim 6, wherein when switched to an active state the first heater is operated on a timed basis with alternating On and Off phases.

8. The method according to claim 5, wherein when switched to an active state, the first heater is operated on a timed basis with alternating On and Off phases.

9. A method for the operation of a metering arrangement, which comprises a meter for feeding a reducing agent solution for exhaust gas after treatment in an exhaust system of a vehicle, wherein the meter is connected by at least one pipe with a supply container containing the reducing agent solution, the method comprising:
   separately controlling a first heater and a second heater, wherein the first heater heats the meter and the second heater heats pipe sections directly connected to the meter,
   wherein the first and second heaters are operated in sequence with respect to each other such that as a result of the in sequence operation of the first and second heaters the reducing agent solution in the meter freezes at a point in time before freezing of the reducing agent solution in the pipe sections directly connected to the meter,
   wherein the first and second heaters are arranged and operated such that a point in time of thawing of the reducing agent solution in the meter is established in relation to a point in time of thawing of the reducing agent solution in the pipe sections,
   wherein, during a thawing operation, at least a part of the pipe sections is brought from a temperature below a freezing point of the reducing agent solution to a temperature of the freezing point of the reducing agent solution at a point in time before this is achieved by the reducing agent solution in the meter.

10. A method for the operation of a metering arrangement, which comprises a meter for feeding a reducing agent solution for exhaust gas after treatment in an exhaust system of a vehicle, wherein the meter is connected by at least one pipe with a supply container containing the reducing agent solution, the method comprising:
    separately controlling a first heater and a second heater, wherein the first heater heats a pump for pressurization of the meter and the second heater heats pipe sections directly connected to the pump, and
    freezing the reducing agent solution in the pump at a point in time before freezing of the reducing agent solution in the pipe sections directly connected to the pump by operating the first and second heaters in sequence with respect to each other.

11. The method according to claim 10, wherein the first and second heaters are arranged and operated such that a point in time of thawing of the reducing agent solution in the pump is established in relation to a point in time of thawing of the reducing agent solution in the pipe sections.

12. A method for the operation of a metering arrangement, which comprises a metering device for feeding a reducing agent solution for exhaust gas after treatment in an exhaust system of a vehicle, wherein the metering device is connected by at least one pipe with a supply container containing the reducing agent solution, the method comprising:
    separately controlling a first heating device and a second heating device, wherein the first heating device heats a first component of the metering arrangement and the second heating device heats a second component of the metering arrangement, and establishing a point in time of freezing of the first component or of a part of the first component in relation to a point in time of freezing of the second component or of a part of the second component by operating the first and second heaters in sequence with respect to each other, wherein the first heating device or the second heating device are operated in a reheating operation subsequent to a switch-off of an internal combustion engine of the vehicle if an outside temperature is below a predetermined threshold temperature, wherein the first heating device is switched active for a second settable period of time after a first settable period of time of an inactive state directly following the switching-off of the internal combustion engine.

13. A method for the operation of a metering arrangement, which comprises a meter for feeding a reducing agent solution for exhaust gas after treatment in an exhaust system of a vehicle, wherein the meter is connected by at least one pipe with a supply container containing the reducing agent solution, the method comprising:

separately controlling a first heater and a second heater, wherein the first heater heats a pump for pressurization of the meter and the second heater heats pipe sections directly connected to the pump, wherein the first and second heaters are operated in sequence with respect to each other such that as a result of the in sequence operation of the first and second heaters reducing agent solution in the pump freezes at a point in time before freezing of the reducing agent solution in the pipe sections connected to the pump, wherein the first and second heaters are arranged and operated such that a point in time of thawing of the reducing agent solution in the pump is established in relation to a point in time of thawing of the reducing agent solution in the pipe sections, wherein, during a thawing operation, at least a part of the pipe sections is brought from a temperature below a freezing point of the reducing agent solution to a temperature of the freezing point of the reducing agent solution at a point in time before this is achieved by the reducing agent solution in the pump.

* * * * *